(12) United States Patent
Burton

(10) Patent No.: US 11,489,996 B2
(45) Date of Patent: Nov. 1, 2022

(54) WIRELESS EARPIECE CAMERA APPARATUS

(71) Applicant: Johnny Burton, West Chicago, IL (US)

(72) Inventor: Johnny Burton, West Chicago, IL (US)

( * ) Notice: Subject to any disclaimer, the term of this patent is extended or adjusted under 35 U.S.C. 154(b) by 14 days.

(21) Appl. No.: 17/218,893

(22) Filed: Mar. 31, 2021

(65) Prior Publication Data
US 2022/0321763 A1  Oct. 6, 2022

(51) Int. Cl.
*H04N 5/232* (2006.01)
*G03B 29/00* (2021.01)
*H04R 1/10* (2006.01)

(52) U.S. Cl.
CPC ......... *H04N 5/23206* (2013.01); *G03B 29/00* (2013.01); *H04N 5/23218* (2018.08); *H04R 1/1091* (2013.01)

(58) Field of Classification Search
CPC ........... H04N 5/23206; H04N 5/23218; H04R 1/1091; G03B 29/00
USPC ......................................... 348/158, 164, 376
See application file for complete search history.

(56) References Cited

U.S. PATENT DOCUMENTS

| | | | | |
|---|---|---|---|---|
| 8,587,719 B2 * | 11/2013 | Zhang | ................... | G03B 17/02 348/222.1 |
| 8,593,570 B2 | 11/2013 | Boland | | |
| D704,158 S | 5/2014 | Fisher | | |
| 9,277,103 B1 * | 3/2016 | Hales | .................. | H04N 5/2253 |
| 10,553,196 B1 | 2/2020 | Stewart | | |
| 2008/0266448 A1 | 10/2008 | Reiner | | |
| 2009/0247245 A1 | 10/2009 | Strawn | | |
| 2010/0039493 A1 | 2/2010 | Chao | | |
| 2016/0198254 A1 * | 7/2016 | Gecawicz | ............ | H04R 1/1058 381/375 |
| 2016/0262513 A1 * | 9/2016 | O'Neill | ................ | H04M 1/185 |
| 2018/0324515 A1 * | 11/2018 | Boesen | ............... | H04R 1/1041 |
| 2019/0132665 A1 * | 5/2019 | Hankey | ................ | H02J 7/0042 |
| 2021/0400127 A1 * | 12/2021 | Fisher | .................. | H04M 1/725 |

FOREIGN PATENT DOCUMENTS

WO   WO2010054245   5/2010

* cited by examiner

*Primary Examiner* — Thai Q Tran
*Assistant Examiner* — Stephen R Smith

(57) ABSTRACT

A wireless earpiece camera apparatus for handsfree camera operation during video calls includes a housing having a housing front side, a housing back side, a housing left side, a housing right side, a housing top side, and a housing bottom side. A microcontroller is coupled within the housing. A speaker is coupled within the housing and is in operational communication with the microcontroller. A plurality of controls is coupled to the housing. The plurality of controls is in operational communication with the microcontroller. A camera is coupled to the housing and is flush mounted with the housing front side. The camera is in operational communication with the microcontroller. A Bluetooth transceiver is coupled within the housing. The Bluetooth transceiver is in operational communication with the microcontroller and is in wireless communication with a smartphone.

5 Claims, 9 Drawing Sheets

WIRELESS EARPIECE CAMERA APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wireless earpiece devices and more particularly pertains to a new wireless earpiece device for handsfree camera operation during video calls. The present device includes a camera to send video signal to a cellphone. A Bluetooth transceiver transmits video signal while receiving audio from the cellphone.

(2) Description of Related Art Including Information Disclosed Under 37 CFR 1.97 and 1.98

The prior art relates to wireless earpiece devices. Most earpiece devices do not include cameras and are used only for audio signal. Of those existing devices that include a camera, the camera is often not flush mounted within the housing of the earpiece.

BRIEF SUMMARY OF THE INVENTION

An embodiment of the disclosure meets the needs presented above by generally comprising a housing having a housing front side, a housing back side, a housing left side, a housing right side, a housing top side, and a housing bottom side. A microcontroller is coupled within the housing. A speaker is coupled within the housing and is in operational communication with the microcontroller. A microphone is coupled to the housing and is in operational communication with the microcontroller. A plurality of controls is coupled to the housing. The plurality of controls is in operational communication with the microcontroller. A camera is coupled to the housing and is flush mounted with the housing front side. The camera is in operational communication with the microcontroller. A Bluetooth transceiver is coupled within the housing. The Bluetooth transceiver is in operational communication with the microcontroller and is configured to be in wireless communication with a smartphone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
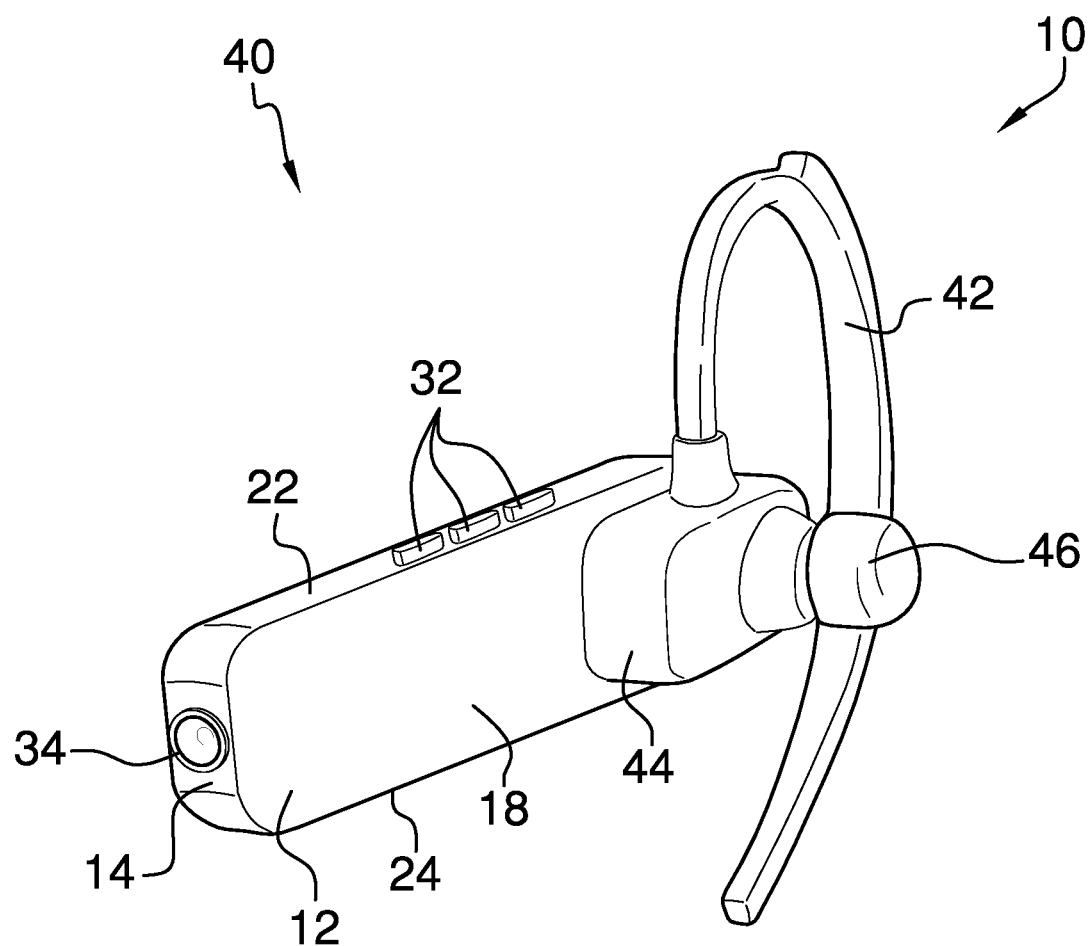
FIG. 1 is an isometric view of a wireless earpiece camera apparatus according to an embodiment of the disclosure.

With reference now to the drawings, and in particular to FIGS. 1 through 9 thereof, a new wireless earpiece device embodying the principles and concepts of an embodiment of the disclosure and generally designated by the reference numeral 10 will be described.

As best illustrated in FIGS. 1 through 9, the wireless earpiece camera apparatus 10 generally comprises a housing 12 having a housing front side 14, a housing back side 16, a housing left side 18, a housing right side 20, a housing top side 22, and a housing bottom side 24. A microcontroller 26 is coupled within the housing 12. A speaker 28 is coupled within the housing 12 and is in operational communication with the microcontroller 26. A microphone 30 is coupled to the housing 12 and is in operational communication with the microcontroller 26.

A plurality of controls 32 is coupled to the housing 12. The plurality of controls is in operational communication with the microcontroller 26. A camera 34 is coupled to the housing 12. The camera 34 is flush mounted with the housing front side 14. The camera 34 is in operational communication with the microcontroller 26.

A Bluetooth transceiver 36 is coupled within the housing 12. The Bluetooth transceiver 36 is in operational communication with the microcontroller 26. The Bluetooth transceiver being is to be in wireless communication with a smartphone 38 to send video and audio signal from the camera 34 and the microphone 30 to the smartphone 38.

Figure 2:
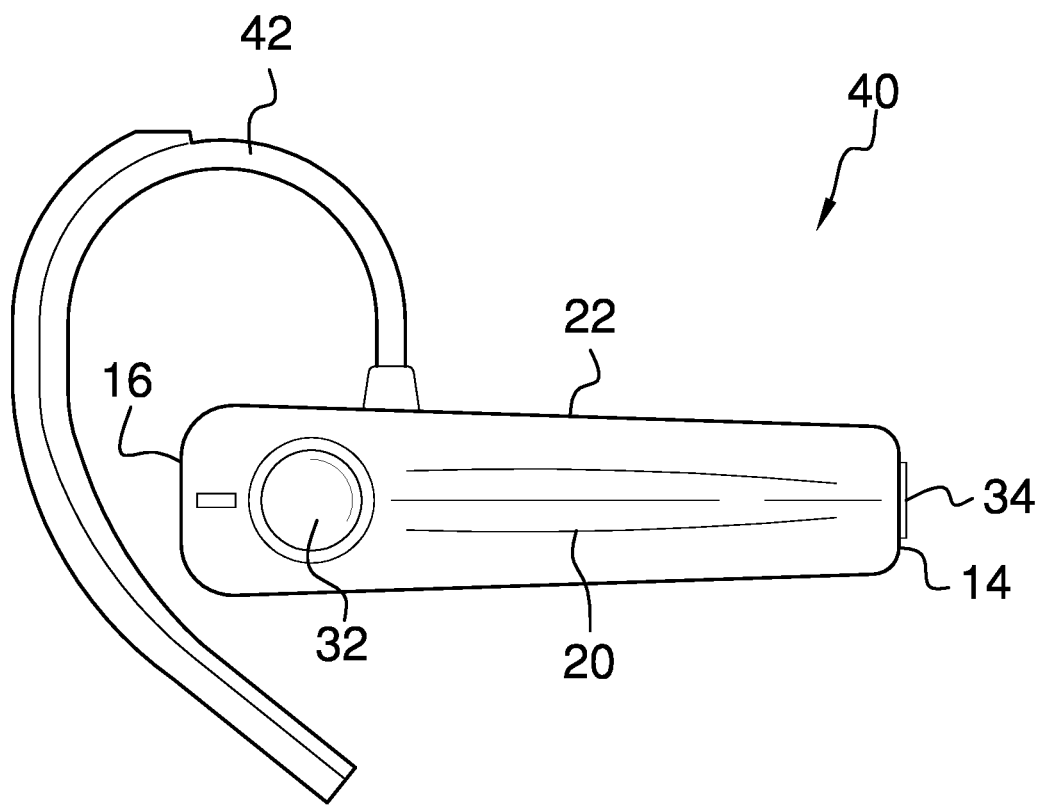
FIG. 2 is a side elevation view of an embodiment of the disclosure.
Figure 3:
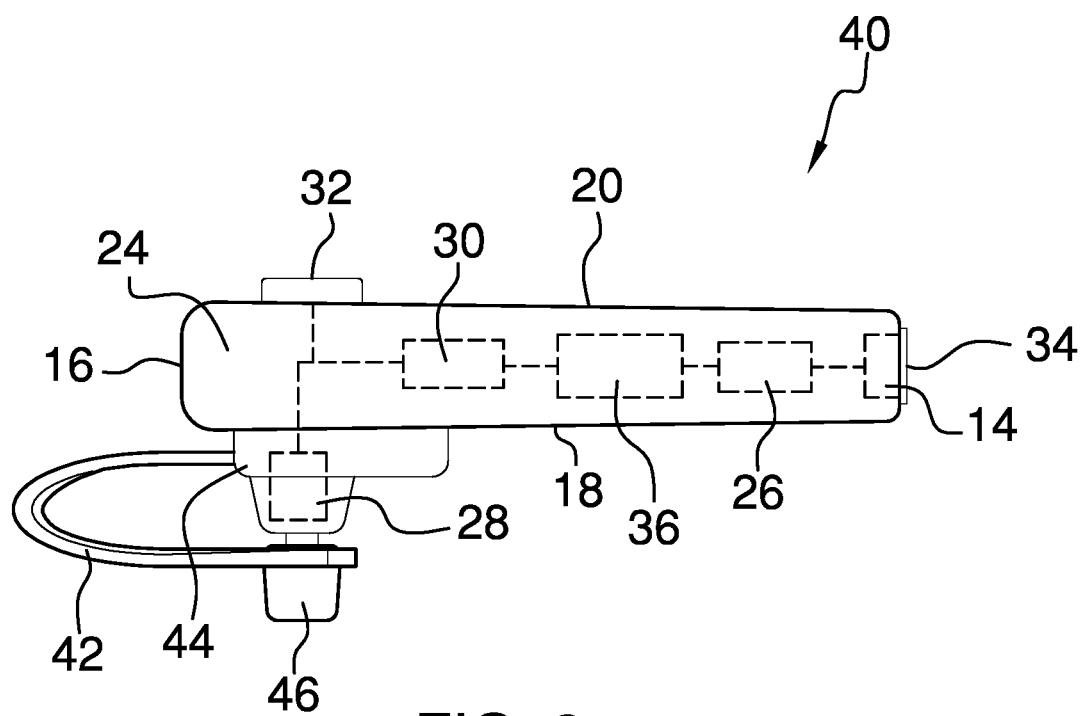
FIG. 3 is a bottom plan view of an embodiment of the disclosure.
Figure 4:
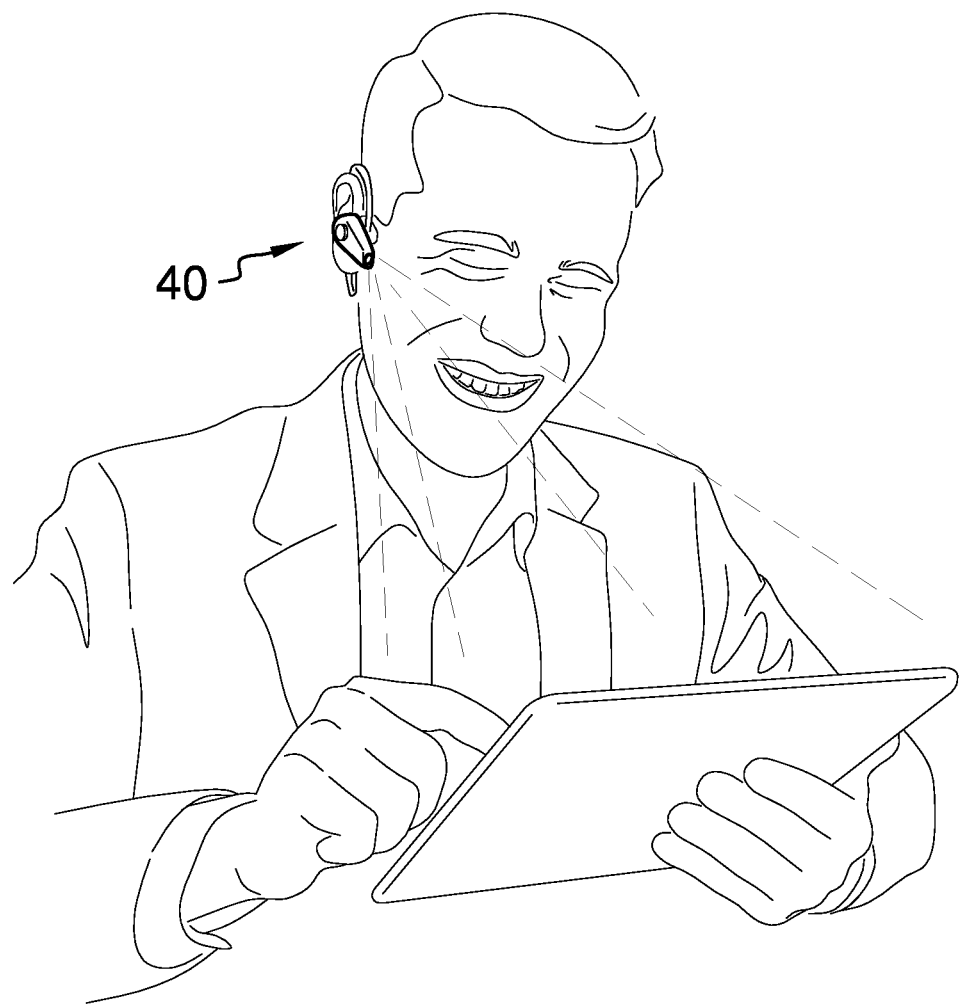
FIG. 4 is an in-use view of an embodiment of the disclosure.

An earpiece embodiment of the invention 40 shown in FIGS. 1-3 includes an ear loop 42 coupled to the housing 12. The ear loop 42 is coupled to the housing top side 22 and is configured to wrap around a user's ear. The housing left side 18 may have a protrusion portion 44. An earbud 46 is coupled to the protrusion portion 44 and is in operational communication with the speaker 28. The plurality of controls 32 is coupled to the housing top side 22 and the housing right side 20. The housing left side 18 and the housing right side 20 may taper from the housing back side 16 to the housing front side 14.

Figure 5:
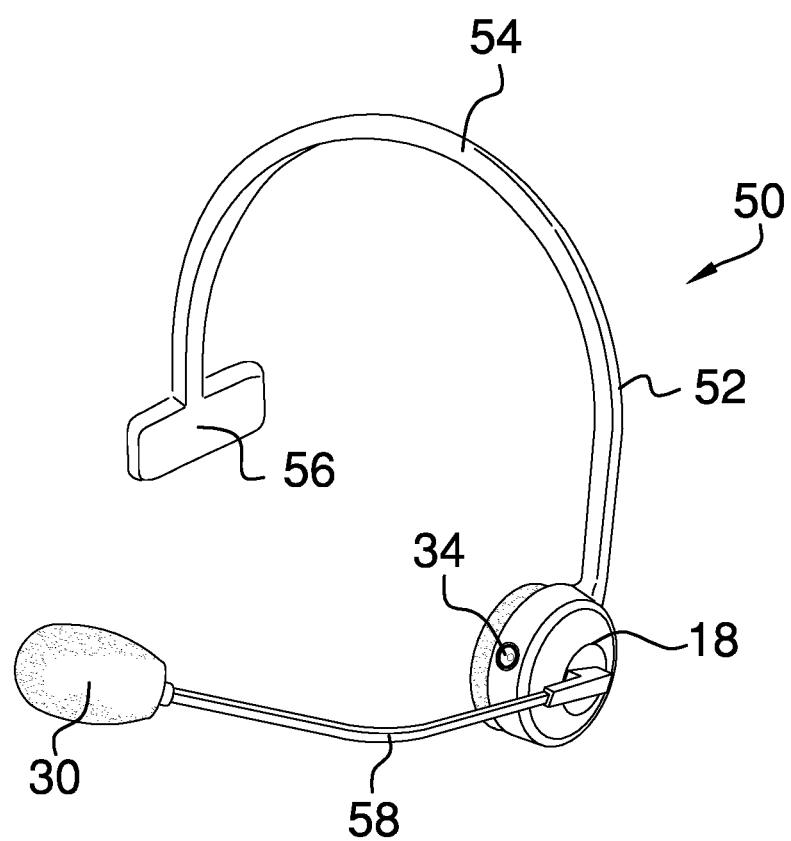
FIG. 5 is an isometric view of an embodiment of the disclosure.

A headset embodiment 50 of the invention shown in FIG. 5 includes the housing left side 18 being circular. A headband 52 is coupled to the housing top side 22. The headband 52 has an arched portion 54 and a rectangular rest portion 56. A boom 58 is coupled to the housing 12. The boom 58 is pivotably coupled to the housing left side 18 and the microphone 30 is coupled to the boom 58.

Figure 6:
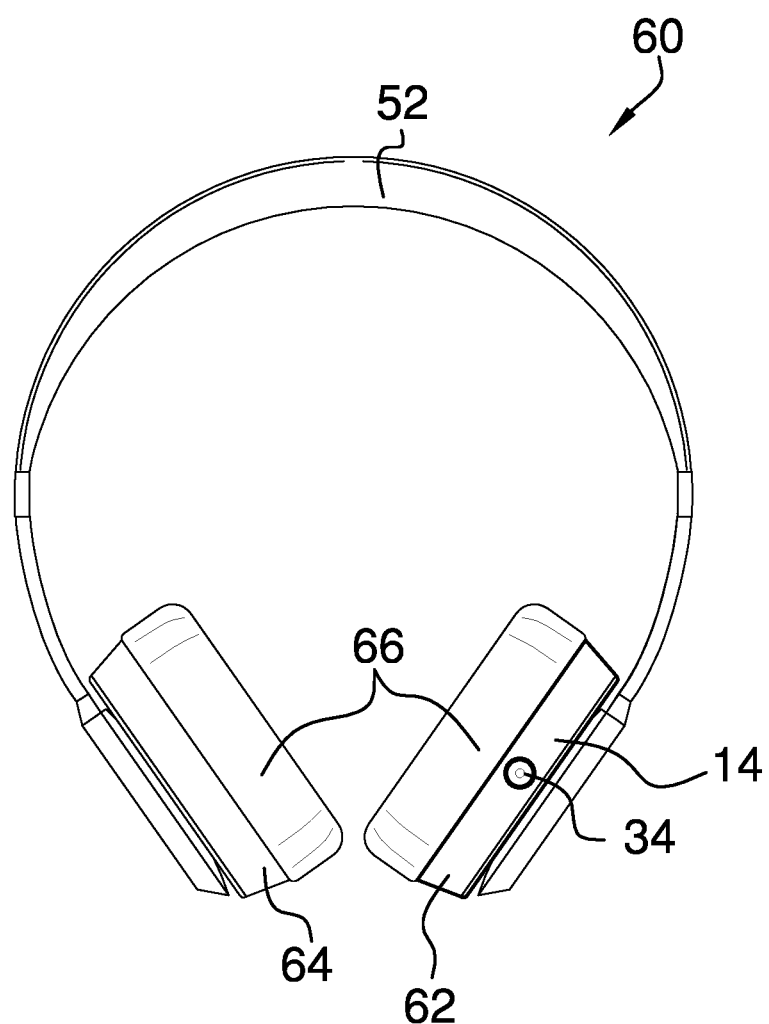
FIG. 6 is a front elevation view of an embodiment of the disclosure.

An over-ear headphone embodiment of the invention 60 shown in FIG. 6 includes the housing 12 including a left housing section 62 and a right housing section 64. The speaker 28 is coupled within each of the left housing section 62 and the right housing section 64. The headband 52 extends between the left housing section 62 and the right housing section 64. A pair of ear cushions 66 may be coupled to the left housing section 62 and the right housing section 64.

Figure 7:
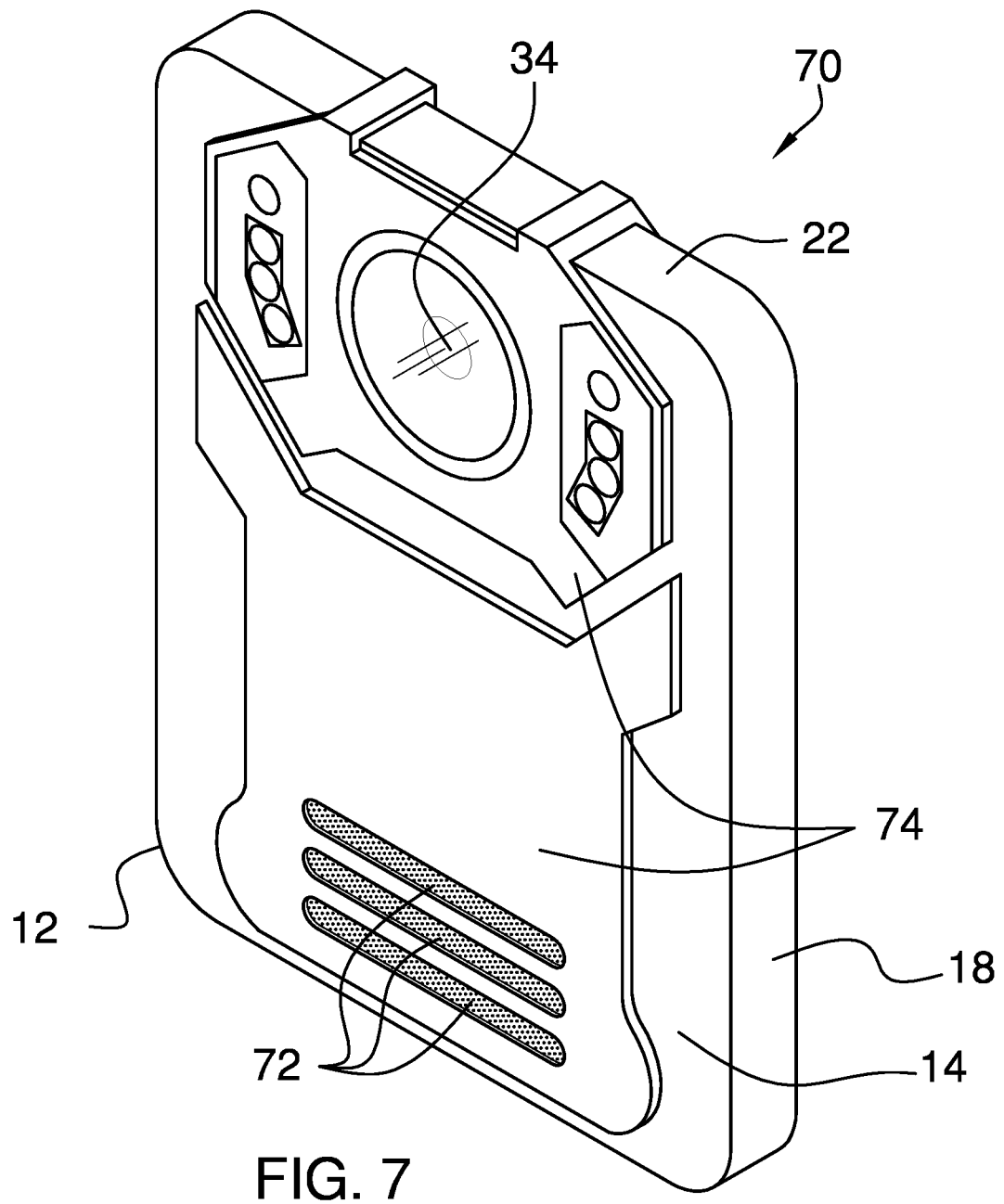
FIG. 7 is an isometric view of an embodiment of the disclosure.
Figure 8:
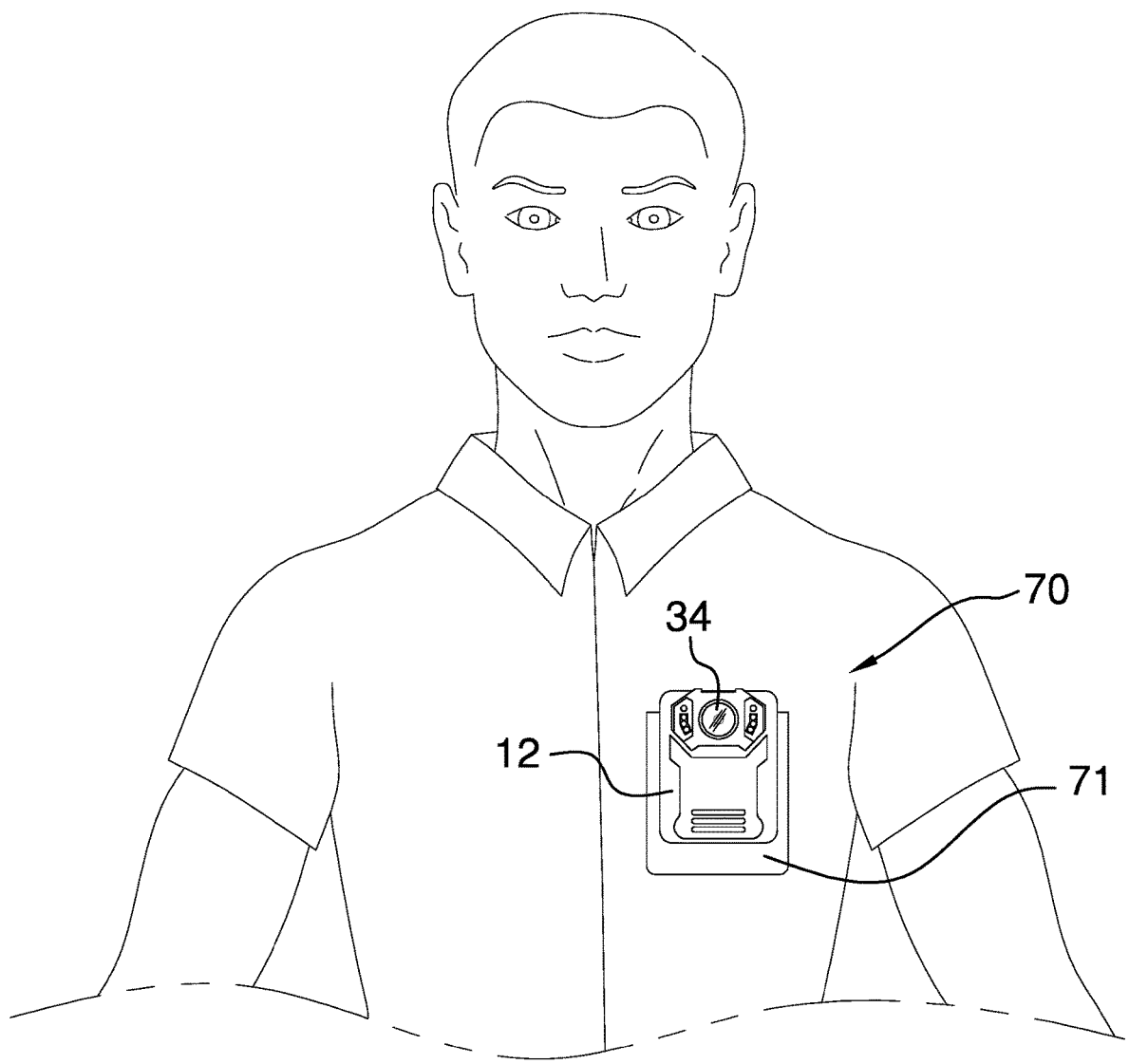
FIG. 8 is an in-use view of an embodiment of the disclosure.
Figure 9:
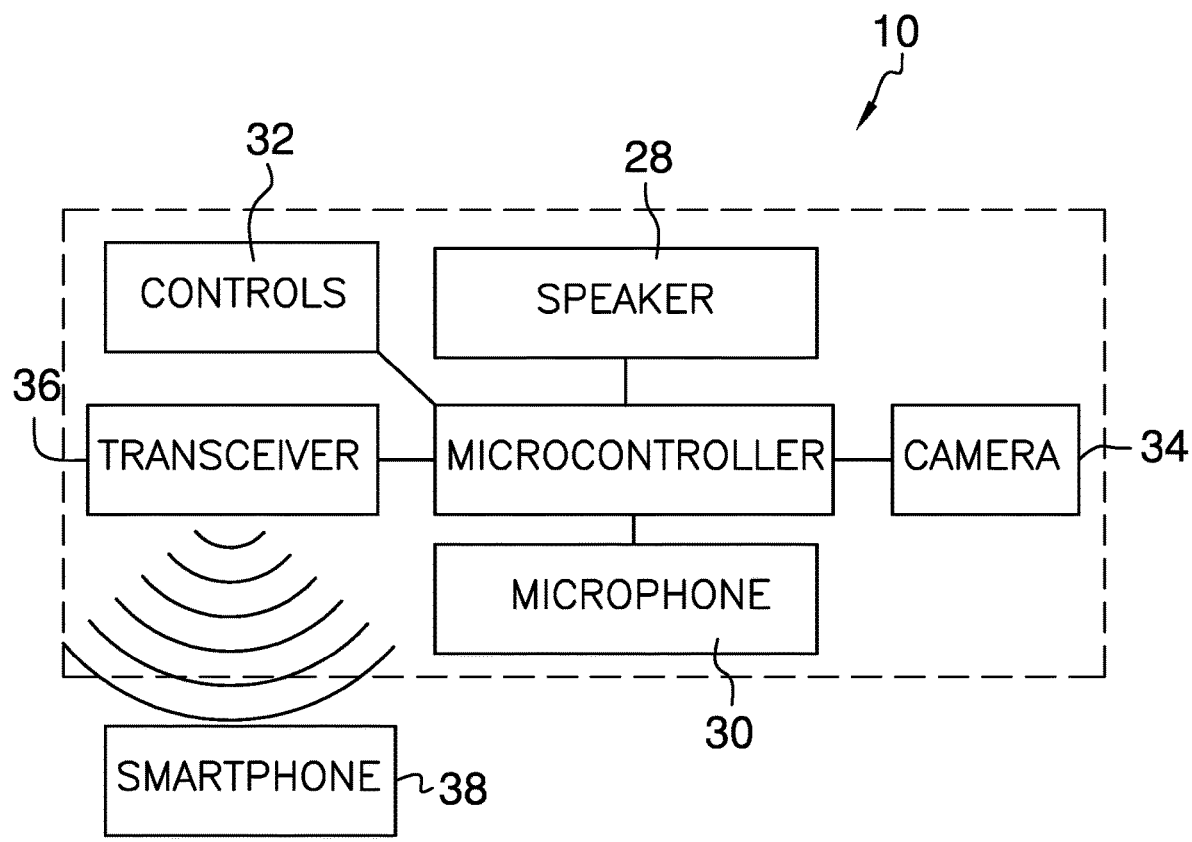
FIG. 9 is a block diagram view of an embodiment of the disclosure.

A bodycam embodiment of the invention 70 shown in FIGS. 7-8 includes the housing 12 being rectangular and configured to fit within a user's front pocket 71. The corners of the housing 12 may be rounded for user comfort. The speaker 28 is coupled to the housing front side 14 and may include a set of three parallel obround grilles 72. A plurality of protective protrusions 74 is coupled to the housing 12. The plurality of protective protrusions 74 surrounds the camera 34 and the speaker 28.

In use, the Bluetooth transceiver 36 is paired with the smartphone 38. During video calls, sound from the call can be reproduced through the speaker 28 and video feed captured by the camera 34 can be sent to the smartphone 38. The user may thus provide hands-free video coverage of his or her field of vision.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wireless earpiece camera apparatus comprising:
   a housing having a housing front side, a housing back side, a housing left side, a housing right side, a housing top side, and a housing bottom side, the housing left side having a protrusion portion, the protrusion portion having a rearward edge adjacent to the housing back side, the protrusion portion being elongated extending forwardly away from the housing back side;
   a microcontroller coupled within the housing;
   a speaker coupled within the housing, the speaker being in operational communication with the microcontroller;
   a microphone coupled to the housing, the microphone being in operational communication with the microcontroller;
   a plurality of controls coupled to the housing, the plurality of controls being in operational communication with the microcontroller;
   a camera coupled to the housing, the camera being flush mounted with the housing front side, the camera being in operational communication with the microcontroller; and
   a Bluetooth transceiver coupled within the housing, the Bluetooth transceiver being in operational communication with the microcontroller, the Bluetooth transceiver being configured to be in wireless communication with a smartphone;
   an ear loop coupled to the housing, the ear loop being coupled to the housing top side and being configured to wrap around a user's ear, a base of the ear loop extending from the protrusion portion at a center between the rearward edge and a forward edge of the protrusion portion; and
   an earbud being coupled to the protrusion portion and being in operational communication with the speaker, the earbud being positioned adjacent to the rearward edge of the protrusion portion.

2. The wireless earpiece camera apparatus of claim 1 further comprising the plurality of controls being coupled to the housing top side and the housing right side.

3. The wireless earpiece camera apparatus of claim 1 further comprising the housing left side and the housing right side tapering from the housing back side to the housing front side.

4. The wireless earpiece camera apparatus of claim 1 further comprising the housing being rectangular and configured to fit within a user's front pocket.

5. A wireless earpiece camera apparatus comprising:
   a housing having a housing front side, a housing back side, a housing left side, a housing right side, a housing top side, and a housing bottom side, the housing left side having a protrusion portion, the housing left side and the housing right side tapering from the housing back side to the housing front side, the protrusion portion having a rearward edge adjacent to the housing back side, the protrusion portion being elongated extending forwardly away from the housing back side;
   an ear loop coupled to the housing, the ear loop being coupled to the housing top side and being configured to wrap around a user's ear, a base of the ear loop extending from the protrusion portion at a center between the rearward edge and a forward edge of the protrusion portion;

a microcontroller coupled within the housing;

a speaker coupled within the housing, the speaker being in operational communication with the microcontroller;

an earbud coupled to the housing, the earbud being coupled to the protrusion portion and being in operational communication with the speaker, the earbud being positioned adjacent to the rearward edge of the protrusion portion;

a microphone coupled to the housing, the microphone being in operational communication with the microcontroller;

a plurality of controls coupled to the housing, the plurality of controls being in operational communication with the microcontroller, the plurality of controls being coupled to the housing top side and the housing right side;

a camera coupled to the housing, the camera being flush mounted with the housing front side, the camera being in operational communication with the microcontroller; and a Bluetooth transceiver coupled within the housing, the Bluetooth transceiver being in operational communication with the microcontroller, the Bluetooth transceiver being configured to be in wireless communication with a smartphone.

\* \* \* \* \*